U̇nited States Patent Office 3,609,870
Patented Oct. 5, 1971

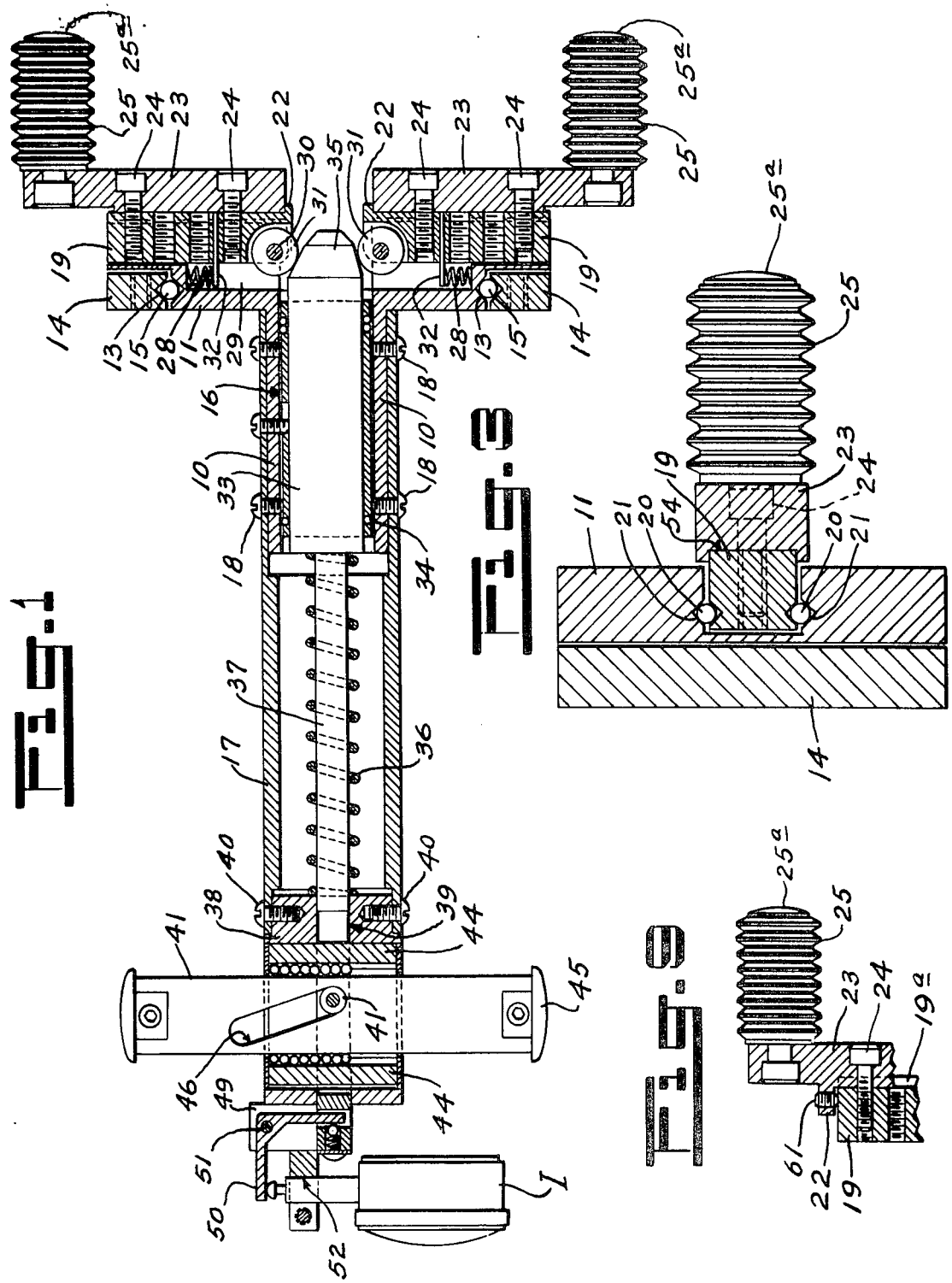

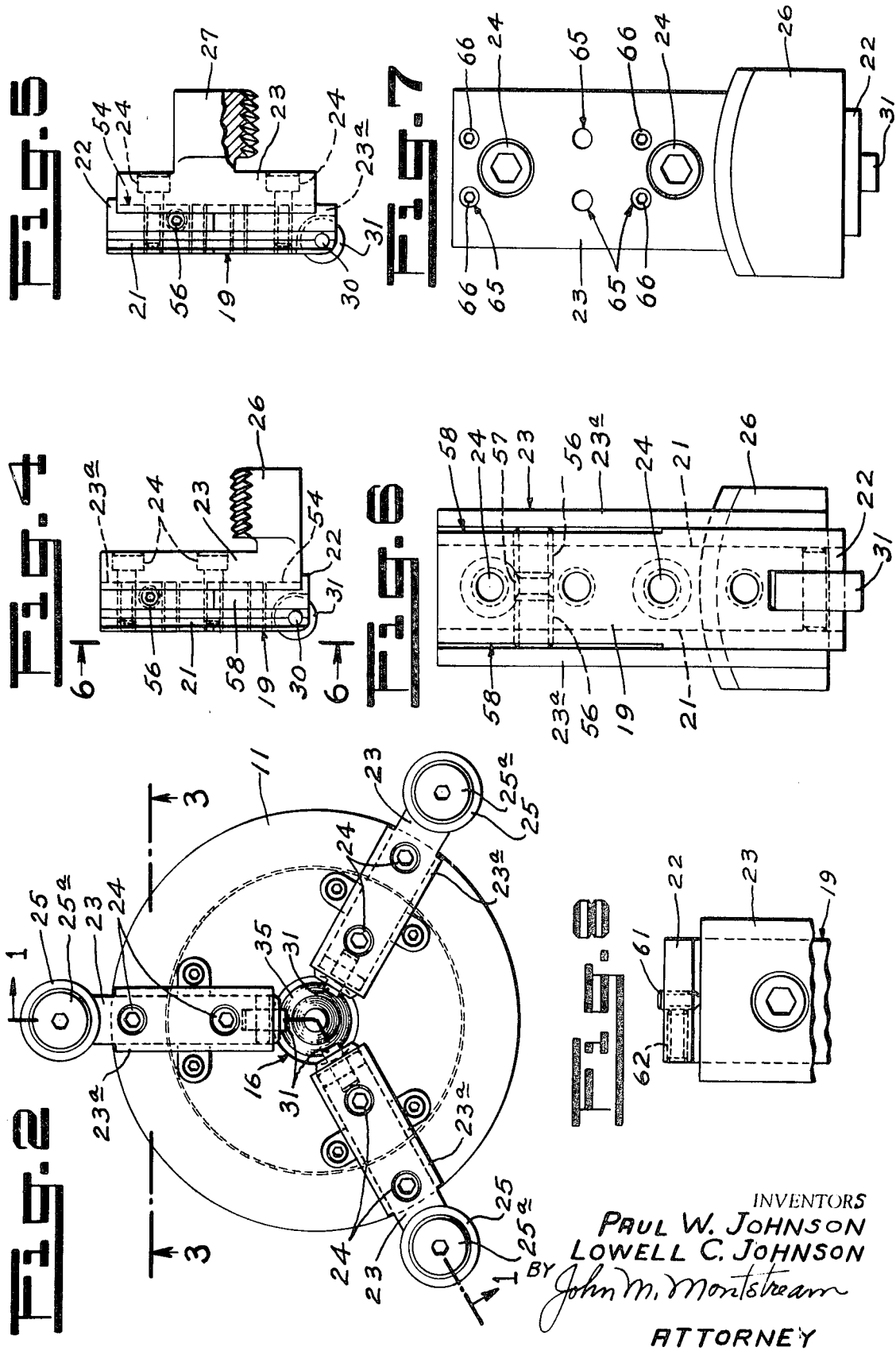

3,609,870
DIMENSIONAL GAGE WITH RADIALLY MOVABLE GAGING MEANS
Paul W. Johnson, Bloomfield, and Lowell C. Johnson, Gramby, Conn., assignors to The Johnson Gage Company, Bloomfield, Conn.
Filed Jan. 4, 1967, Ser. No. 607,329
Int. Cl. G01b 5/08
U.S. Cl. 33—178 R                                3 Claims

ABSTRACT OF THE DISCLOSURE

A gage is disclosed having radially movable gaging means comprising a slide and a carrier secured thereto with the carrier carrying a gaging element. A projection or radial abutting means is carried by the slide or carrier and engages the other for positive radial retention of the carrier with respect to the slide. The projection or radial abutting may be adjustable. Lateral retention means is also provided between the slide and carrier. For gaging means with an arcuate gaging element, one or more additional means are provided for adjusting each gaging means in a lateral direction to bring the arcuate gaging element into arcuate alignment and in a planar direction for an accurate planar relationship between gaging elements.

---

The invention relates to a dimensional gage for testing as to whether or not a surface, and particularly a thread or spline, is within the allowable tolerances. The invention is directed principally to a gage which retains its setting in use by using an abutting projection between the gaging element carrier and its slide. The gage also provides one or more of three adjusting means for precise adjustment of the carrier on its slide. A form of gage to which the invention is illustrated in Pat. 3,296,705 dated Jan. 10, 1967.

An object of the invention is to construct a gage which retains its accurate setting in operation.

Another object is a gage which provides a correcting angle for gaging elements of substantial length.

A further object is to provide each gaging means with at least one of three precision adjusting means.

Other objects of the invention will be more apparent from the following description when taken with the accompanying drawings illustrating preferred embodiments thereof, in which, FIG. 1 is a longitudinal section through a gage taken on line 1—1 of FIG. 2;
FIG. 2 is an end view of the gage;
FIG. 3 is a section taken on line 3—3 of FIG. 2;
FIGS. 4 and 5 show segmental gaging means for internal and external threads respectively;
FIG. 6 is a view of an alignment means;
FIG. 7 shows a radial correcting means;
FIG. 8 shows means for planar and angular correction;
FIG. 9 shows an abutting projection on the slide.

The gage includes a frame member 10 having radial guideway means shown particularly as a disk 11. The disk has a plurality of radial guides, usually two for smaller dimensions, with three being shown. The guides in the illustrated construction take the form of radial channels with ball grooves in the opposed sides of the channel. These guideways in a three element gage are spaced 120 degrees apart. In many gaging operations, it is desirable to know whether or not another surface is or is not concentric with or square with respect to the axis of the thread. Such tests may be made with a plurality of surfaces. For this additional test, disc 11 carries a concentric circular bearing surface 13 on a periphery thereof and shown as a ball groove on which is mounted a ring 14 for rotation on the bearing 13. The bearing particularly shown includes balls 15. The ring is provided with one or more threaded holes for mounting one or more indicators. The frame member also includes an axial guideway 16 shown as a bore which is concentric with the axis of the frame member. The frame member includes an extension 17 secured in place by screws.

Each radial guideway carries gaging means which is radially movable thereon. Each gaging means includes a slide 19 suitably mounted for radial movement, such as on ball bearings 20, so that the opposing side edges of the slide and of the radial guideway have ball grooves 21. Each slide carries a projection shown as a flange 22 at or adjacent one of the ends thereof. If the test surface is an internal surface or thread and the flange is carried by the slide it is at or adjacent to the inner end of the slide as illustrated with the segmental gaging element 26 of FIG. 4 having a convex gaging surface. For a gage to test an external surface or thread, the flange is at or adjacent the outer end of the slide as illustrated with the segmental gaging element 27 of FIG. 5 having a concave gaging surface. A carrier 23 is secured to each slide such as by screws 24. The slide has a plurality of screw holes to accommodate for gaging means or carriers of many sizes and threads per inch both internal and external and for types of gaging elements both roll and segmental.

Each carrier 23 carries a gaging element shown in FIGS. 1 and 2 as a thread roll 25. Preferably each roll is mounted on an eccentric stud 25a, as is known, for adjustment and on which stud the roll is free to turn. The gaging element may be a segment having an arcuate gaging surface for either an internal or external surface to engage a substantial portion of the surface or thread. If the gaging element is a segment, it may be integral with the carrier as shown, or it may be a separate gaging element secured to its carrier. The carrier is of such length so that a shoulder thereon such as the end thereof abuts the projection 22 on its slide. The abutting surface of the projection engaged by the carrier is precisely qualified as to dimension so that when each carrier abuts against its projection, it is known that all gaging surfaces are at precisely the same radial distance from the axis of the frame member. The projection and abutting end of the carrier is important in assuring that the gaging elements do not change their setting in use and screws alone will not assure this.

It is very desirable too that lateral means be provided to assure that there will be no lateral displacement of the carrier on the slide. The means preferred are side flanges on opposite sides of one of the parts including the slide or the carrier to engage the sides of the other part to retain the gaging elements in proper radial alignment. The flanges 23a are shown as provided on the carrier and integral therewith. Each gaging element has a gaging surface adapted to engage the test surface. For a gaging roll for a test thread, the roll carries thread engaging peripheral ridges. If the gaging element for a thread is a segment, then the gaging surface is a portion of a mating thread. For a spline, the gaging surface is usually an axially extending cylindrical rod.

The projection 22 may be carried by either part including the slide and the carrier and abutting the end of the other part. If the projection is carried by the carrier, then it is located oppositely from that particularly illustrated namely for an external gage, it would be at the inner end of the carrier and at the outer end for an internal gage. Preferably the projection is carried by one of these parts and the flanges by the other part for greater convenience in manufacture. Whether the slide or the carrier carries the projection and whether for an internal gage or an external gage, the gaging pressure from the gaging contact is transmitted between the projection and the end of, or a shoulder on, the other part.

Spring means 28 is provided to propel the gaging means radially inwardly. The spring means shown is mounted in a spring groove 29 in the frame member or disc and abuts one end of the groove and the other end engages its slide 19 such as by means of a pin 30 carried by the slide and projecting into the spring groove.

Operating means is provided to propel the plurality of gaging means radially outwardly. The operating means shown includes an operating member 33 mounted in the axial guideway 16 preferably by means of ball bearings 34. The operating member carries taper means, shown as a cone 35 at the end thereof, which cone engages a roll 31 carried by each of the slides. The operating member has spring means 36 to propel the operating member axially, to the right as shown in FIG. 1 which expands the gaging means or moves them radially outwardly. The spring desirably is around a stem 37 carried by the operating member and this stem is slidably received in a bore 39 passing through a collar 38. This collar is secured to the end of the extension 17 by screws 40. The stem carries a stem roller 41 suitably attached thereto. If the angle of the cone is one whose tangent is .500, then a standard indicator dial can be used.

In a gage for gaging internal surfaces, the spring means 36 is strong enough to overcome the tension of the spring means 28. In a gage for gaging external surfaces, the springs 28 are stronger to overcome the tension of spring 36. The contact of the gaging elements with the test part for both an external and an internal gage is spring tension which is uniform and removes the unequal pressures which would result if an inspector propelled the gaging means into engagement with the test surface.

Suitable manual means is provided to manually move the operating member 33 against the tension of the spring means 36 or 28 whichever is the stronger or dominant. The manual means may take several forms that shown includes a cross guide 44 in the collar in which is received a cam bar 45 having a cam or angular slot 46 in which is received the stem roller 41. Projecting the plunger downwardly propels the operating member 33 to the left so that the spring means 28 contracts each gaging means for insertion thereof within an internal bore or thread. Upon release of the manual means the spring means 36 propels the gaging means radially outwardly into contact with the internal surface. The reverse operation occurs for a gage for an external surface when the spring means 28 contract the gaging elements into contact with the external test surface.

Indicator mounting means is carried by one of the members including the frame member and the operating member and with the contactor of the indicator I located either directly to engage the other member or to be operated by a motion transferring lever from the other member. The indicator mounting means illustrated includes a bracket 49 which is shown as secured to the collar 38 which forms a part of the frame member. This bracket also carries a motion transfer lever 50 pivotally mounted on a pin 51, one arm of which lever engages the contactor of an indicator I secured in the socket or hole 52 and the other arm is engaged by the operating member or particularly by the stem 37 thereof. The position of the operating member when gaging a test surface or thread is transmitted through lever 50 to the indicator contactor.

In a gage for gaging an internal surface, the expanding spring means 36 exerts greater pressure than the retracting spring means 28 for the gaging means. When the operating member is moved to the left, the springs 28 contract the gaging means for insertion of the gaging elements into the test hole after which the cam bar 45 is released whereupon the spring means 36 propels the operating member 33 to the right to expand the gaging means into contact with an internal gaging surface against the pressure of the springs 28. It will be observed, therefore, that gaging contact of the gaging means with its test surface is secured solely by the spring means which removes any variations which unavoidably occur if the gage is one in which the inspector manually brings the gaging members into contact with the surface. This assures uniformity in a gaging operation.

If the gaging elements and particularly the roll type, are of some length, they yield at the outer ends under the gaging pressure. The gage has been designed to enable this to be compensated for. One of the contacting faces of the carrier or the slide has a flat surface without projecting flanges. The slides are shown as provided with a flat surface 54 so that a surface grinder may grind this surface at a slight taper of about .00015 per inch between the inner end and the outer end with the taper being in one direction for an external thread to make the dimension at the outer end of the gaging element a little smaller at the outer end and in the other direction for an internal thread. This is done for relatively flexible gaging elements such as long rolls so that the outer end of the gaging element is a little larger. At the same time that the slide surface is ground, the abutting surface of the projection of the three slides is ground so that they are precisely an equal distance from the axis of the frame member so that a test part is centralized on the axis when engaged by the gaging elements.

It is difficult to grind the arcuate gaging surface of every segment such that the center of the arc is precisely on the radial axis of the radial guideway or slide. The deviation when it occurs is usually of the order of .0001 to .0004 of an inch. Alignment means is provided which includes an alignment adjusting screw on each side of one of the parts including the carrier and the slide and engaging the other. The screws 56 are shown as carried by the carrier 23. The screw hole 57 for the screws is spaced from the edge of the flange so that a part of the end of the screw is under the flange but the wrench socket is open or unobstructed by the flange for insertion of an adjusting wrench. This adjustment is more effective if the side faces of the slide have a shallow cut out 58 therein which shortens the length of contact between the side and flange. Raising one screw and lowering the other will tilt the segment sufficiently to bring the arc of the segment into precise position.

A gage particularly for a large diameter is usually provided with suitable means to avoid cross threading or improper mounting of the test part on the gaging elements.

In manufacturing every part of a gage and every component of a part, it is very easy to have a small error creep in. Although this error in any one particular part of the manufacture may be of the order of .0001 of an inch, which would be of no particular significance if it were one error solely, however, an accummulation of such an error in other steps or portions of gage parts or surface could become significant in a gage. It is for this reason that means are provided for making other correcting adjustments so that any one or more of the errors, which might creep into the gage in the manufacture of each part thereof, can be adjusted to the precise requirements of the gage.

It has been stated above that the contacting shoulder of the projection 22 is qualified precisely to the proper dimension. The fact remains that a very small error, as mentioned above, may arise in the location of this shoulder and it would be economically expensive to re-insert a part, which may not be precisely accurate, into a grinding machine and grind the same for correction. A simple adjustment correction is provided by having a hole through the projection 22 in which is received a radial adjusting screw 61. This adjusting screw is locked in adjusted position by a lock screw 62 carried by the projection and having its end tightened into contact with the adjusting screw after the latter has been properly adjusted. The radial adjusting screw provides for radial adjustment of a gaging element on its respective slide. This adjustment will not change with continued use of the gage and retains the gaging element as fixed in position in use as the shoulder on the projection 22 would directly perform this function.

FIG. 8 illustrates adjusting means for planar adjustment as well as adjustment in two angular directions. This adjusting means is shown as at least four threaded holes 65 in the gaging element rectangularly spaced with respect to each other. Six such holes are illustrated. An adjusting screw 66 is received in at least any one pair of the holes and for planar adjustment three is necessary and four desirable. These adjusting screws are located in convenient positions depending upon the location of the gaging segment. In other words in a gaging element carrier as shown in FIG. 5 with the gaging segment located centrally, the holes will be on opposite sides of the segment. By adjusting all four screws, the planar position of the gaging segment may be adjusted to bring it into proper alignment with the other segments. By adjusting the screws on the right side, the segment may be given an angular adjustment with respect to a radial axis. Similarly by adjusting the two screws on the other or left hand side an opposite angular adjustment may be given to the segment. Also by adjusting the upper two or the lower two screws an angular tilt may be given to the segment in two directions with respect to a plane through the segment which is vertical to the longitudinal axis of the gage. The adjustment may be both planar and angular to bring each segment into precise alignment.

The gaging means illustrated has provisions then for angular adjustment of the segment as to the arc of the gaging surface in screws 56, for radial adjustment in the screw 61, adjustment of the segment in a planar direction by adjustment of all of the four screws 66, also angular adjustment in two directions on a radial axis by adjusting one pair of the adjusting screws adjacent to one longitudinal side of the segmental gaging element as well as angular adjustment in two directions by adjustment of the upper or lower pair of adjusting screws. The gage carrying the gaging means described when properly adjusted will provide a gage with gaging elements which are precisely accurate in every dimension. In all seven adjustments are provided. The adjusting screws preferably have a fine pitch in order to make a precise adjustment. Adjusting screws having standard threads have been found satisfactory.

The frame and the operating means may take several forms and that shown in FIG. 1 is merely illustrative. The gaging means described, including the slide and its carrier with a gaging element, secured to the slide, may be used on each of the guideways of the gage of application S.N. 570,595 filed Aug. 5, 1966, now Pat. 3,388,476. This gage uses a rotary cam ring as the operating member. In this gage the indicator is operated from a gaging means through a motion transmitting leverage.

In setting up the gage for an internal or external surface to be gaged, the spring tension of one or both of the two spring means are adjusted so that the spring 36 is dominant for gaging an internal surface and for gaging an external surface spring means 28 is made dominant. The manual means 45 is also reversed or operated in reverse to manually propel the gaging means to the position for insertion of the gaging means on the test surface or thread which would be contraction or radially inwardly for an internal test surface and expansion or radially outwardly for an external test surface.

FIG. 9 illustrates the manner in which the projection 22 may be carried by the carrier 23 and the abutting shoulder is on the slide 19 which for an internal gage would then be at the opposite or radially outer end as distinguished from the inner end as shown in FIG. 1. The gaging or contacting pressure from the gaging element is from the projection 22 to the shoulder so that the setting cannot be changed from constant use of the gage. In such construction the flanges 19a are preferably carried by the slide and they engage the sides of the gaging element carrier 23.

The ball bearings have balls slightly larger than the space between ball races of about 5 to 15 ten thousandths of an inch and are pressed into the space so that there will be no shake in the parts yet permit full freedom of movement in a gaging direction under the tension of the spring means.

This invention is presented to fill a need for improvements in a dimensional gage with radially movable gaging elements. It is understood that various modifications in structure, as well as changes in mode of operations, assembly, and manner of use, may and often do occur to those skilled in the art, especially after benefiting from the teachings of an invention. This disclosure illustrates the preferred means of embodying the invention in useful form.

What is claimed is:

1. A dimensional gage for a test part having opposite surfaces which gage is adapted to carry at least one indicator having a contactor comprising a frame member having an axis, a plurality of radial guideways carried by the frame member and angularly spaced from each other; gaging means mounted in each radial guideway for radial movement; operating means for moving all gaging means radially for insertion and removal of the gage from the test part and to engage and gage the test surface including an operating member mounted on the frame member and operatively connected with the gaging means to move the latter radially outwardly, a first spring means engaging the operating member to propel the same in a direction to move the gaging means radially outwardly, second spring means engaging the gaging means to propel the same radially inwardly, one of said spring means providing greater tension than the other dependent upon whether the test surface to be gaged is internal or external, and manual means connected with the operating member to move the same against the tension of the spring means of greater tension for application of the gage to the test surface; each gaging means including a slide movable radially on the guideway, a carrier secured to the slide, a gaging element carried by the carrier and having a gaging surface, one of the parts of each gaging means including the slide and the carrier having a projection at one end thereof having an abutting surface and the other part having a shoulder abutting the projection, the abutting surface of each projections being precisely dimensioned with respect to the axis of the frame, the projection being located at that end of the part to transmit gaging pressure from one to the other of the projection and the shoulder; indicator mounting means carried by the frame member and located to have the indicator contactor of an indicator carried thereby responsive to the position of the gaging means; and the carrier having opposite edges and each gaging means includes a pair of adjusting screws carried by the carrier adjacent to at least one edge thereof and engaging the face of the slide.

2. A dimensional gage as in claim 1 in which each gaging means includes a pair of adjusting screws at the other edge of the carrier and engaging the face of the slide.

3. A dimensional gage as in claim 2 including lateral means carried by one of the parts including the slide and the carrier and engaging the other part to retain the parts against lateral displacement, and each gaging means includes a radial adjusting screw carried by the projection and engaging the shoulder, said radial adjusting screw having a short length and high pitch to provide adjustment in ten thousandths of an inch.

References Cited
UNITED STATES PATENTS 1,395,231   10/1921   Kenyon _____ 33—199 X LEONARD FORMAN, Primary Examiner S. L. STEPHAN, Assistant Examiner U.S. Cl. X.R.

33—199 R